Jan. 14, 1930.  H. S. JANDUS  1,743,218
BUMPER
Filed March 19, 1927  2 Sheets-Sheet 1
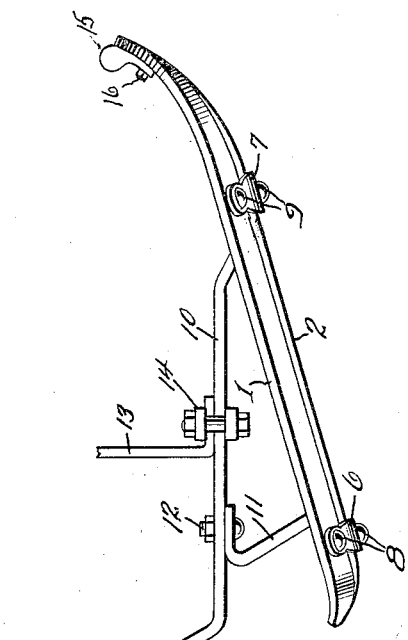
Fig. 1
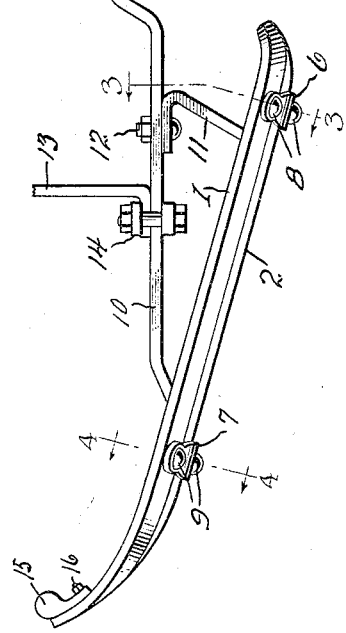
Fig. 2
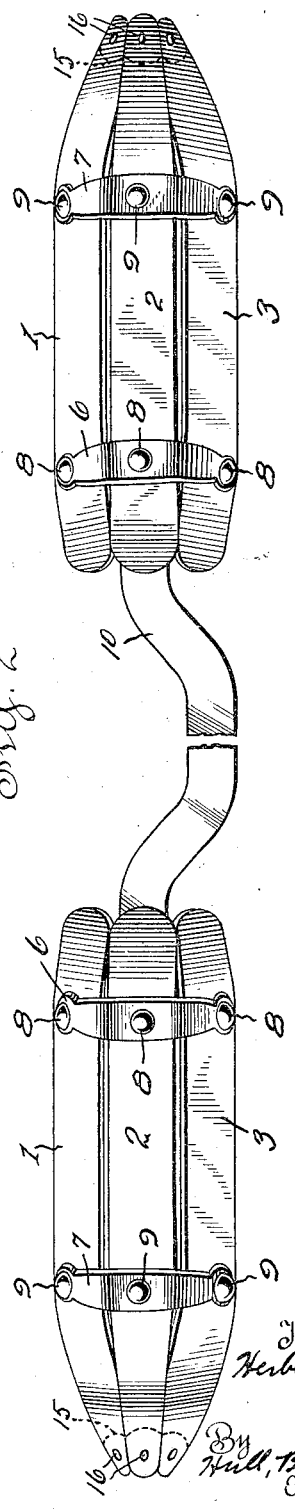
Inventor
Herbert S. Jandus
By Hull, Brock and West
Attorneys Jan. 14, 1930. H. S. JANDUS 1,743,218
BUMPER
Filed March 19, 1927 2 Sheets-Sheet 2
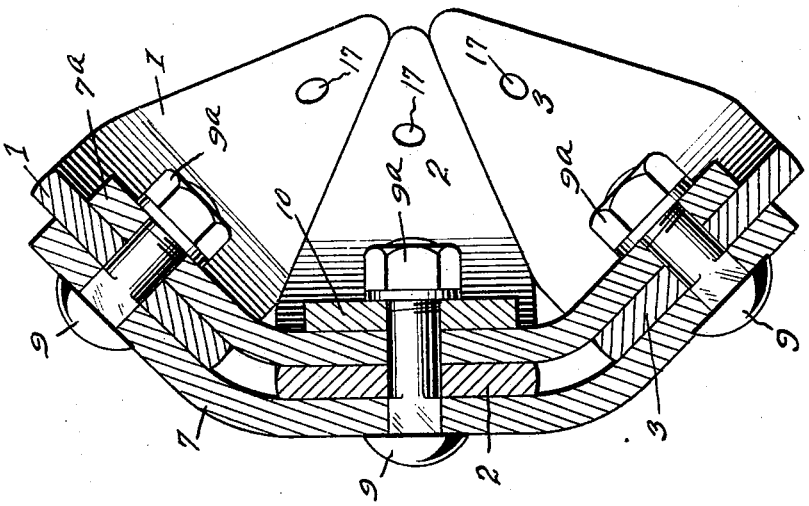

Patented Jan. 14, 1930

1,743,218

UNITED STATES PATENT OFFICE

HERBERT S. JANDUS, OF DETROIT, MICHIGAN, ASSIGNOR, BY MESNE ASSIGNMENTS, TO GENERAL SPRING BUMPER CORPORATION, A CORPORATION OF MICHIGAN

BUMPER

Application filed March 19, 1927. Serial No. 176,667.

This invention relates to vehicle bumpers and more particularly to a bumper designed to be used in conjunction with a spare tire, or other accessory, for the protection of the rear of a vehicle. Another object of the invention is to produce a bumper of the type described and which will give more adequate protection to the fenders and other exposed portions at the sides of the rear of the vehicle. A further object is to provide a bumper which will in addition present a more attractive appearance.

Other objects will be apparent from the following description and the accompanying drawings, and from the use of the combinations of elements set forth in the claims.

Fig. 1 of the drawings shows a plan view of the bumper with the attaching members applied thereto; Fig. 2 is a rear elevation of the bumper shown in Fig. 1; Fig. 3 is a sectional view taken on the line 3—3 of Fig. 1; Fig. 4 shows a sectional view taken on the line 4—4 of Fig. 1 with portions omitted.

In the following description and claims the bumper will be assumed to be attached to the rear end of a vehicle and reference will be made to the "front" and "rear" portions in view of this assumption but it is not intended in so doing to limit its use to any particular position on the vehicle.

In the drawings reference characters 1, 2 and 3 indicate three similar bars, preferably of spring steel and protected by a coating of nickel or other suitable metal, which extend across a portion of one half of the rear of the vehicle in a position to protect the rear fender on that side. The central bar 2 is preferably placed in a vertical plane and the bars 1 and 3 are placed respectively above and below the bar 2 and in planes inclined to the vertical. The three bars are tapered and so bent at their outer ends as to make a smooth tapered curve and are bent at their inner ends to form a smooth curve. The outer ends of the bars are rigidly connected to each other by means of the plate 15 adapted to bear upon the forward surfaces of the bars and being connected to them by means of the bolts 16 passing through the apertures 17 in the outer end portions of the bars. The plate 15 is enlarged and rounded at its outer end and so positioned as to extend beyond the ends of the bars 1, 2 and 3 and thereby reduces the possibility of hooking behind or scratching objects with which it may come in contact.

The impact bars 1, 2 and 3, are further held in their proper positions by means of two clamps 6 and 7. These clamps are made up of rear plates 6 and 7 adapted to bear at their central portions upon the rear surface of the bar 2 and at their end portions upon the rear surface of the bars 1 and 3, front plate 6ª and 7ª adapted to bear at their central portions upon the front surface of the bar 2 and at their end portions upon the front surfaces of the bars 1 and 3, and bolts 8, 8, 8 and 9, 9, 9 passing through the clamp plates 6, 6ª and 7, 7ª respectively and through the bars 1, 2 and 3. These plates are preferably of cast metal but may be of other material, such as spring steel, if desired. By tightening the nuts 8ª, 8ª, 8ª and 9ª, 9ª, 9ª, the impact bars are held rigidly in place between the clamp plates 6, 6ª and 7, 7ª.

The description of my invention has been confined to the impact section at one side of the vehicle, the section at the other side being of like construction and similarly placed with respect to the rear fender on that side. These two sections, made up of the clamped bars 1, 2 and 3, are connected together and supported by the front bar 10 which is attached at its ends to the clamp plates 7ª by means of the bolts 9 passing through the plates 7 and 7ª and the impact bar 2. The inner ends of the impact elements are braced by means of suitable bars 11, 11 which are attached at their rear ends to the clamp plates 6ª by means of the bolts 8 passing through the clamp plates 6, 6ª and the impact bars 2, and which are attached at their forward ends to the front bar 10 by means of the bolts 12, 12. The front bar 10 may be suitably bent, as shown in the drawings, for the accommodation of the tire carrier or other accessories attached to the rear of the car.

The impact elements and front bar 10 are supported by arms 13, 13 attached at their front end portions to the vehicle (not shown)

and attached at their rear end portions to the bar 10 by means of the clamps 14, 14.

A blow struck upon the impact element would be resisted by the usual forces opposing bending, tension and compression stresses in the several members and in addition would be resisted by a force opposing the torsional stresses set up in the impact bars 1 and 3 due to the twisting of these bars by the force of the impact. A blow struck at either end of the impact elements would be deflected and glance off because of the smooth curved surface presented and the rigidity of the end portion would be increased because of the curve.

The impact element may be attached directly to the vehicle rather than to the front bar 10 and it is not essential to my invention that the two impact elements be connected to each other although this is desirable since it permits convenient attachment to the vehicle and effective bracing of the members of the impact elements.

It is apparent that the clamping devices shown in the drawings for attaching the front bar and the brace 11 to each other or to the impact elements, or the clamps 14, 14, may be replaced by suitable pivotal clamps. It is further apparent that the clamps 6 and 7 may be replaced by other suitable means for holding the bars in their proper position.

It is also apparent that the impact element may be made up of two, or more than three, impact bars placed in planes at different angles to each other and it is not intended to restrict the invention to the particular number of bars or the particular arrangement herein shown. Furthermore it is apparent that the bars need not be tapered or curved at their ends, although I prefer this arrangement and also that the bars may be spaced at their end portions if such spacing is desirable.

The several impact bars of each of the impact sections are shown as positioned to lie substantially in the arc of a circle. It is apparent that by increasing the number of bars the arc may be extended to any desired portion of a circle. Each section of the bumper, in effect, forms a tubular impact section or a segment of a tubular impact section and by decreasing the space between each of the bars, and/or the width of each bar, an impact section with a substantially smooth curved surface may be formed. It is apparent that the impact bars in contact at their ends, and/or connected by the clamp plates, will provide arched impact sections which will be more rigid because of such arched construction and so less liable to bend when struck.

Having thus described my invention, what I claim is:—

1. A vehicle bumper including a pair of spaced impact elements each made up of a plurality of impact bars supported in planes at different angles to the vertical, clamping means for holding the bars, connecting means between the two impact elements, said connecting means comprising a bar attached at its end portions to the outer end portions of the impact elements and braces between the inner end portions of the impact elements and the connecting bar, and support arms adapted to be attached to the vehicle.

2. A vehicle bumper including a pair of spaced impact elements each made up of a plurality of impact bars supported in planes at different angles to the vertical, clamping means for holding the bars, said clamping means comprising plates adapted to bear upon the front and rear surfaces of the impact bars and bolts for drawing the plates toward each other, connecting means between the two impact elements and support arms adapted to be attached to a vehicle.

3. A vehicle bumper including a pair of spaced impact elements each made up of a plurality of impact bars supported in planes at different angles to the vertical, clamping means for holding the bars, said clamping means comprising plates adapted to bear upon the front and rear surfaces of the impact bars and bolts for drawing the plates toward each other, connecting means between the two impact elements, said connecting means consisting of a bar attached at its end portions to the outer end portions of the impact elements and braces between the inner end portions of the impact elements and the connecting bar, and support arms adapted to be attached to a vehicle.

4. A vehicle bumper including a pair of spaced impact elements each made up of a plurality of impact bars supported in planes at different angles to the vertical, clamping means for holding the bars, connecting means between the two impact elements, said connecting means comprising a bar bent at its central portion to avoid obstructions and attached at its end portions to the end portions of the impact elements, braces between the inner end portions of the impact elements and the first mentioned connecting bar, and support arms adapted to be attached to the vehicle.

5. A vehicle bumper including a pair of spaced impact elements each made up of a bar in substantially a vertical plane, one or more bars attached to said first mentioned bar and positioned in a plane other than the vertical, clamping means for holding said bars and means for connecting the impact elements, said connecting means comprising a bar attached at its end portions to the outer end portions of the impact elements and braces between the inner end portions of the impact elements and the said connecting bar.

6. A vehicle bumper including a plurality of impact bars extending across a portion only of the width of the vehicle, the planes of said bars being at different angles to the vertical and the bars being tapered and bent at their outer ends to form a smooth continuous curved tapered portion, clamping means for holding the bars, and means for supporting the impact element from a vehicle.

7. A vehicle bumper including a pair of spaced impact elements each made up of a plurality of impact bars supported in planes at different angles to the vertical and having tapered curved ends which cooperate in forming curved points, clamping means for holding the bars, means for connecting the impact elements, and support means adapted to be attached to a vehicle.

8. A vehicle bumper including a pair of spaced impact elements each made up of a plurality of impact bars supported in planes at different angles to the vertical and having tapered curved ends which cooperate in forming curved tapered portions, clamping means for holding the bars, means for connecting the impact elements, said connecting means comprising a bar attached at its end portions to the outer end portions of the impact elements, braces between the inner end portions of the impact elements and the connecting bar, and support means adapted to be attached to a vehicle.

9. A vehicle bumper including spaced impact elements made up of bars mounted in planes inclined to each other and having ends tapered and bent to form smooth continuous curved points, a connecting bar attached to the outer end portions of an impact element, and braces between the inner end portions of the impact element and the connecting bar.

10. A vehicle bumper including impact elements made up of central bars mounted in substantially vertical planes, bars mounted above and below, and in planes inclined to that of the central bar, said bars having their outer ends tapered and bent to form continuous curved tapered portions, a bar connecting the end portions of the impact elements, and bars bracing the other end portions of the impact elements.

11. A vehicle bumper including spaced impact elements each made up of a plurality of bars supported in planes at different angles to the vertical, said bars being rigidly connected to each other at their outer ends by means of a plate having a rounded end and adapted to extend beyond the ends of the bars.

12. A vehicle bumper including spaced impact elements each made up of a plurality of bars supported in planes at different angles to the vertical and having their outer ends fastened to each other, a connecting bar attached at its end portions to the outer end portions of the impact elements, braces between the inner end portions of the impact elements and the connecting bar, and clamping means for holding the impact bars in proper spaced relation.

13. A vehicle bumper comprising spaced impact sections each made up of a plurality of bars having their adjacent edges in contact at their end portions and spaced laterally intermediate said end portions, means for clamping said bars together and means, connecting said impact sections, for supporting the same from a vehicle.

14. A vehicle bumper comprising spaced impact sections each made up of a plurality of bars in planes inclined to each other and having their adjacent edges in contact at their end portions and spaced apart intermediate such end portions, means for clamping said bars together and means, connecting said impact sections, for supporting the same from a vehicle.

15. A vehicle bumper comprising spaced impact sections, each made up of a plurality of bars adapted to extend across a portion of a vehicle and having their surfaces in planes inclined to each other, a rear bar connected to the impact sections at points spaced inwardly from the outer ends of said sections and adapted to support the impact section from a vehicle.

16. A vehicle bumper comprising spaced impact sections, each including a plurality of bars having their outer surfaces positioned in the arc of a circle extending laterally of the impact section, said bars having the edges of their outer end portions adjacent each other, and means connecting said sections for supporting them from a vehicle.

17. A vehicle bumper comprising spaced impact sections, each including a plurality of bars having their outer surfaces positioned in the arc of a circle extending laterally of the impact section, said bars having the edges of their outer end portions adjacent each other at these portions, means for rigidly connecting the ends of the impact bars, and means connected to the impact sections at points spaced from their outer ends for supporting them from a vehicle.

18. A vehicle bumper comprising a pair of spaced impact sections, each section including a plurality of bars arranged in planes inclined to each other, said bars having their edges at the end portions adjacent each other, means for rigidly connecting the outer ends of the bars, and means for supporting said impact sections from a vehicle, said last mentioned means including a bar connected to the impact sections at points spaced inwardly from their outer ends.

In testimony whereof, I hereunto affix my signature.

HERBERT S. JANDUS.